Feb. 15, 1966     J. G. E. COHN ETAL     3,235,406
CATALYTIC ELECTRIC CELLS
Filed Aug. 24, 1960     4 Sheets-Sheet 1
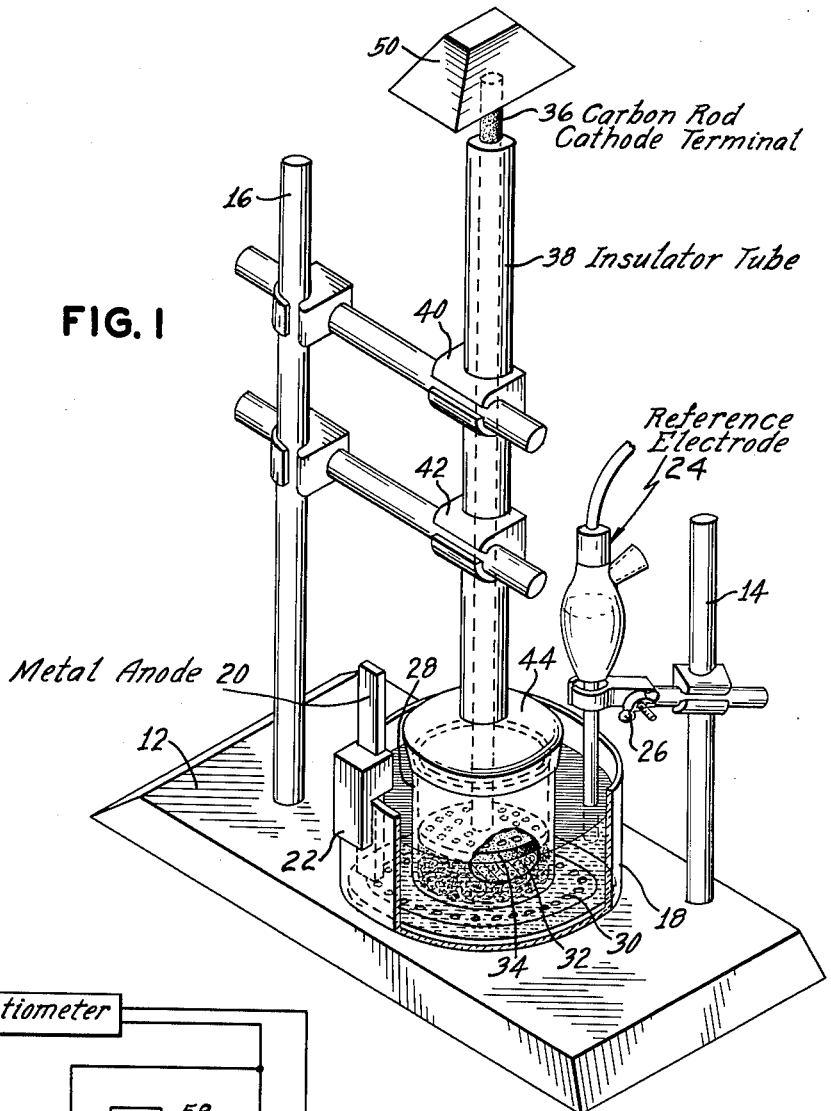
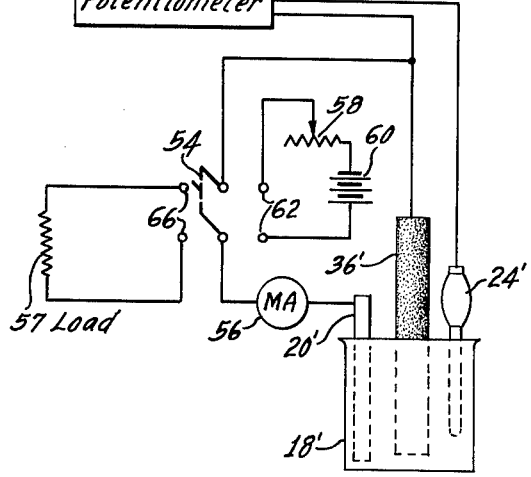
INVENTORS
JOHANN G. E. COHN
ANNA P. HAUEL
BY Karl Hahn
James E. Bryan
Alan C. Rose
ATTORNEYS

United States Patent Office 3,235,406
Patented Feb. 15, 1966

3,235,406
CATALYTIC ELECTRIC CELLS
Johann G. E. Cohn and Anna P. Hauel, West Orange, N.J., assignors to Engelhard Industries, Inc., Newark, N.J., a corporation of Delaware
Filed Aug. 24, 1960, Ser. No. 51,744
11 Claims. (Cl. 136—86)

The present invention relates to primary cells for generating electricity, including fuel cells.

As is well known, the standard dry cell includes zinc as the anode or anodic reactant, and manganese dioxide as the cathodic reactant or "depolarizer." The manganese dioxide is normally mixed with carbon, and this mixture is pressed around a carbon rod which serves as the positive terminal of the dry cell.

In the Leclanche type dry cell described above, electricity is generated by the anodic oxidation of the metallic zinc and the cathodic reduction of manganese dioxide. When the zinc anode and the cathode are externally connected by an electric circuit, electrons flow in the external circuit from the zinc anode to the cathode, and thus allow the reaction to continue.

While the Leclanche cell has withstood the test of time, and is still widely used, it has several drawbacks for specific purposes. Thus, its initial high voltage when it is first connected to energize a load, is subject to a rapid decline as discharge of the cell progresses. In addition, for applications where weight must be minimized, the manganese dioxide depolarizer is relatively heavy per unit of derived current.

Accordingly, important objects of the present invention include the maintenance of a more constant discharging voltage, and reduction in the weight of the cathodic reactant. Another object is to improve the potential of electric generating cells using organic cathodic reactants.

In accordance with the present invention, it has been determined that the operation of electricity generating cells may be improved by the use of a platinum group catalyst at the cathodic reaction zone. While any of the six platinum group elements may be employed as the catalyst, particularly improved results have been obtained with palladium and rhodium catalysts.

As noted above, the depolarizer or cathodic reactant is frequently admixed with carbon and the cathode structure may be of carbon in the form of a rod or the like. In accordance with another feature of the present invention, the platinum group metal catalyst may be supported on the carbon. In this manner, it is intimately contacted with the cathode in the cathodic reaction zone.

Improved results have been shown by the use of platinum group catalysts in the cases of a wide variety of cathodic reactants including aromatic and aliphatic compounds. Specifically, aromatic ring, acetylenic and nitro compounds show improved cathodic reactant action in the presence of platinum group metal catalysts.

Other objects, features and advantages of the invention may be readily apprehended from a consideration of the folding detailed description and from the drawings, in which:

FIG. 1 shows an electric cell employed primarily for testing purposes;

FIG. 2 represents circuitry which may be employed with the apparatus of FIG. 1;

Figure 3:
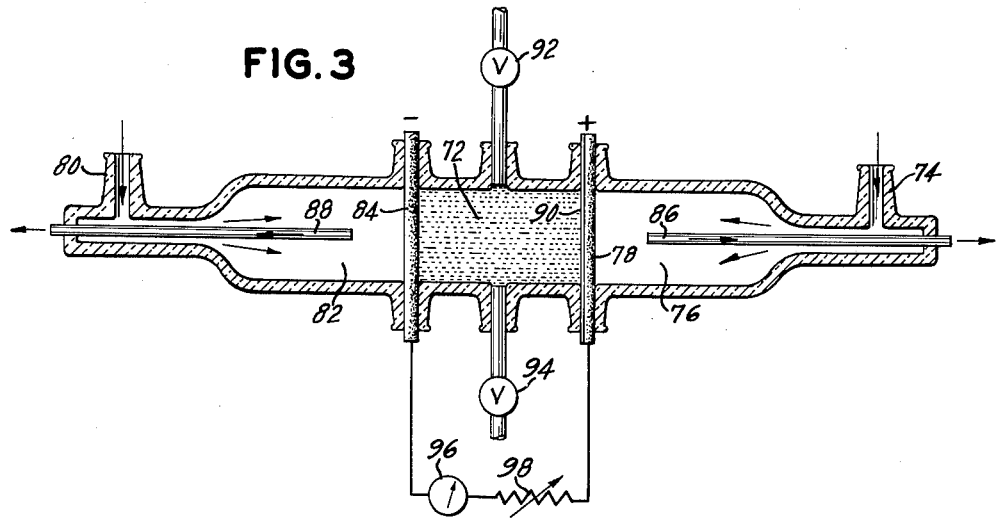
FIG. 3 is a diagram of a fuel cell.

With reference to FIG. 1 of the drawings, an arrangement is shown which conveniently permits the testing and comparison of cathodic reactants. It is a primary cell including a cathodic assembly as described below.

With these arrangements, cathodic potentials may be studied independently of anodic conditions. The apparatus is similar to that which has been used by others for electric cell experiments, see Journal of the Electrochemical Society, volume 103, pages 94 and 95, C. K. Morehouse and R. Glicksman, 1956.

The apparatus includes a base 12, two upright support members 14 and 16, and a container 18 which may be made of glass. The container 18 is partially filled with a suitable electrolyte, as discussed above. A metal anode 20 is mounted by the support 22 with one end immersed in the electrolyte within the container 18. The anode 20 may suitably be of magnesium or zinc; alternatively, particularly for use with strongly acid electrolytes, the test electrode 20 may be of an inert material such as platinum. A calomel reference electrode 24 is mounted with its fiber tip immersed in the electrolyte. It is held in position by a suitable clamp 26, which is secured to the upright supporting member 14.

The cathode assembly includes a central hollow cylinder 28, which may be made of glass. The glass cylinder 28 rests on a perforated plastic disc 30, and a diaphragm (not shown) is inserted between the disc and the cylinder. This assembly is supported by the bottom of the container 18. Above the disc 30 and within the cylinder 28 is a mass of carbon powder 32, with a perforated carbon disc 34 overlying the powder. An elongated carbon rod 36 bears on the upper surface of the perforated carbon disc 34 and compresses the carbon powder 32.

The cathodic reactant may be added to the electrolyte in the form of a liquid or in the form of crystals when the cathodic reactant is of the proper form. In the case of fuel cells, the cathodic reactant may be supplied in the form of a liquid or gas. When crystals are employed, they may be combined with the compressed carbon powder 32. The important factor is to make the cathodic reactant available at the cathode of the cell.

When the cathodic reactant is added to the electrolyte, it has access to the carbon powder of the cathode structure through the perforated plastic disc 30 and the diaphragm mentioned above.

The carbon rod 36 is slidably mounted within the insulating tube 38. The tube 38 is held upright by the brackets 40 and 42, which are mounted on the vertical supporting post 16. The cylinder 28 is closed by the apertured stopper 44 through which the carbon rod 36 passes. A weight 50, which, in the present case, weighs 2.5 kilograms, is mounted on the upper end of the carbon rod 36 to compress the carbon powder into a conductive mass.

The circuit for the apparatus of FIG. 1 is shown in FIG. 2. In FIG. 2 the electrolytic cell is shown only schematically. Thus, the apparatus includes the container 18', the anode 20', the calomel reference electrode 24', and the cathode assembly 36'. The potentiometer 52 is connected between the cathode assembly 36' and the reference electrode 24'.

A double-pole, double-throw switch 54 is connected between the anode 20', and the cathode assembly 36'. A milliammeter 56 is connected in series with the anode 20', between the anode and the switch 54. By means of the switch 54, the anode to cathode circuit may be connected either to a suitable load, as represented by resistor 57, or to a circuit including variable resistor 58 and the booster source of direct current 60, which are employed in establishing suitable test conditions. When an inactive anode such as platinum is employed, the cell will not, of course, generate electricity, and all of the current is supplied by the current source 60. Similarly, when an inactive anode is used, it will not supply current to the load 57 when the switch 54 engages contacts 66. When zinc or magnesium is employed as the anode electrode material, however, the load 57 may be energized by connecting the terminals 66 into the cell circuit.

As mentioned above, in the testing of cathodic reactants, it is customary to isolate the cathodic structure from the action taking place at the anode. In addition, current is preferably passed through the cell at a constant rate. In connection with the present examples, a constant current flow of 15 milliamperes is maintained by connecting the booster source of direct current 60 and the variable resistance 58 into the anode to cathode circuit, and adjusting the resistance 58.

FIG. 3 shows a simplified diagram of a fuel cell for the generation of electricity. In the arrangement of FIG. 3, the chamber 72 is filled with electrolyte. The cathodic reactant is supplied through inlet 74 to the chamber 76 where it may enter the porous metal cathode 78. Similarly, the anodic reactant is supplied through tube 80 to the chamber 82 where it may enter the porous anode 84. The cathode 78 and anode 84 are porous plates which divide the fuel cell into three sections. The exhaust tubes 86 and 88 are provided for removing reacted material from the chambers 76 and 82, respectively. The platinum group metal catalysts discussed above are suitable for increasing the cathodic reaction rate in fuel cells. In connection with the fuel cell of FIG. 3, a trace 90 of the platinum group metal catalyst is deposited in any suitable manner on the porous-sintered cathode 78. By way of example, palladium may be chemically deposited on a sintered porous nickel cathode to produce a suitable structure.

The cathodic and anodic reactants supplied to chambers 76 and 82, respectively, may be of either gaseous or liquid form. In the case of crystalline materials, they may be dissolved or dispersed in a suitable medium and supplied to the cathode and anode through the chambers 76 and 82.

In FIG. 3, the valves 92 and 94 are provided for supplying electrolyte to the central reaction chamber 72. In addition, a slight positive pressure may be maintained from the chambers 76 and 82 toward the chamber 72, particularly in the case of gaseous reactants. The valve 92 may provide pressure relief or venting when required. The ammeter 96 and the load 98, represented by a variable resistor, are connected between the cathode 78 and the anode 84. When the fuel cell is in operation, the current which is generated serves to energize the load 98. It is to be understood, of sourse, that in commercial operations many fuel cells may be connected in series.

A number of examples involving tests in which catalysts either were or were not present in a primary cell will now be considered. In general, the catalysts in each example were present in the form of a platinum group metal supported on the powdered carbon, which is included in the test call. The tests were all conducted by the continued operation of the cell, while 15 milliamperes of current were passing through the cell. Each example includes two test cells, one of which employed a catalyst, and one of which did not employ a catalyst.

In Examples 1 and 2 set forth below, the compound, 2 butyne 1-4 diol, is reduced as the cathodic reactant.

*Example 1*

|  | Cell A | Cell B |
| --- | --- | --- |
| Depolarizer | 0.5 gm. of 2 butyne 1-4 diol | 0.5 gm. of 2 butyne 1-4 diol. |
| Additive to the depolarizer. | 0.05 gm. of carbon | 0.05 gm. of carbon supported Pd catalyst. A total of 0.0025 gm. of Pd. |
| Anode | Pure Mg | Pure Mg. |
| Electrolyte | 60 cc. of an aqueous solution with 250 gms. of $MgBr_2 \cdot 6H_2O$ per liter; saturated with $Mg(OH)_2$. pH: 8-8.5. | 60 cc. of an aqueous solution with 250 gms. of $MgBr_2 \cdot 6H_2O$ per liter; saturated with $Mg(OH)_2$. pH: 8-8.5. |
| Operating Temp | 28° C | 28° C. |
| Constant Current Rate. | 15 milliamps | 15 milliamps. |

*Example 2*

|  | Cell C | Cell D |
| --- | --- | --- |
| Depolarizer | 0.5 gm. of 2 butyne 1-4 diol | 0.5 gm. of 2 butyne 1-4 diol. |
| Additive to the depolarizer. | 0.05 gm. of carbon | 0.05 gm. of carbon supported Pd catalyst. A total of 0.0025 gm. of Pd. |
| Anode | Pure Zinc | Pure Zinc. |
| Electrolyte | 60 cc. of an aqueous solution containing per liter 200 gms. of $ZnCl_2$ and 250 gms. of $NH_4Cl$. pH: 3. | 60 cc. of an aqueous solution containing per liter 200 gms. of $ZnCl_2$ and 250 gms. of $NH_4Cl$. pH: 3. |
| Operating Temp | 28° C | 28° C. |
| Constant Current Rate. | 15 milliamps | 15 milliamps. |

In the foregoing examples, the anode in Example 1 was of magnesium and the electrolyte was slightly basic, whereas in Example 2 the anode was of zinc and the electrolyte was slightly acid.

The four cells A through D were individually tested by operation with a constant 15 milliampere current. The results are tabulated below. In the customary manner, the potential is expressed in volts which represent the potential difference between the cathode and a reference hydrogen electrode. Actual measurements were taken between the cathode and a standard calomel reference electrode, and the measured potentials were then converted to standard "hydrogen potentials":

CATHODE POTENTIAL

| Minutes Cumulative | Example 1 | | Example 2 | |
|---|---|---|---|---|
| | Cell A | Cell B [1] | Cell C | Cell D [1] |
| 30 | −0.467 | −0.354 | −0.195 | −0.095 |
| 60 | −0.773 | −0.494 | −0.415 | −0.205 |
| 120 | −0.902 | −0.546 | −0.583 | −0.270 |
| 180 | −0.956 | −0.575 | −0.689 | −0.305 |
| 240 | −0.984 | −0.621 | −0.770 | −0.344 |
| 300 | −0.993 | −0.670 | −0.803 | −0.378 |

[1] With catalyst.

The tests show that cells B and D, which include the platinum metal catalysts, discharge at a higher potential than the comparative cells having plain carbon cathode structures. This is true for both the alkaline and the acid electrolyte. Carbon of identical type was employed in each of cells A through D.

Figure 4:
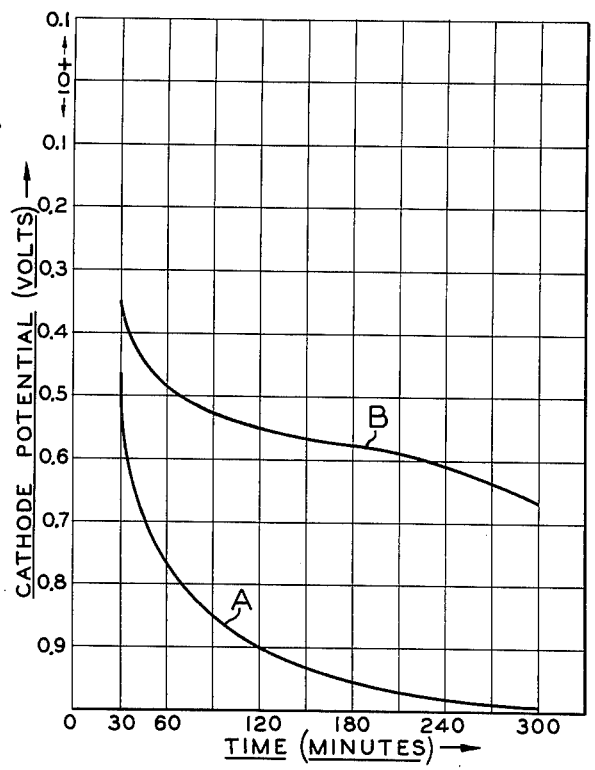
FIGS. 4 through 8 are plots of cathode potential versus time during discharge at a constant current rate for various electric cells.
Figure 5:
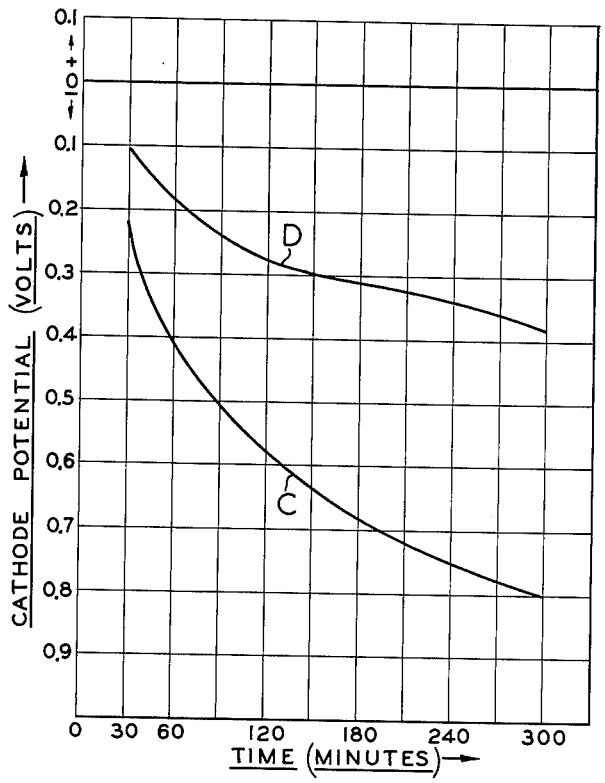

FIGS. 4 and 5 of the drawings illustrate the increase in potential which was obtained in Examples 1 and 2 set forth above. Thus, in FIG. 4, the plot B shows the higher potential which was obtained with the cell including catalytic material as contrasted with the lower potential obtained with the cell A which did not include any catalyst. Similarly, in FIG. 5 the plot D shows the relatively high potential in the cell containing catalytic material as contrasted with the lower potential shown by curve C when no catalyst was employed.

Examples 3, 4 and 5 will now be set forth in a somewhat more abridged manner. Each of these examples involved a pair of cells, one of which employed a platinum group catalyst, and the other cell being without the catalyst:

*Example 3*

| | Cell E | Cell F |
|---|---|---|
| Depolarizer | Benzene | Benzene. |
| Catalyst | None | 5% Rhodium on carbon. |
| Anode | Platinum | Platinum. |
| Electrolyte | 27% H₂SO₄ | 27% H₂SO₄. |
| Constant Current Rate. | 15 milliamps | 15 milliamps. |

*Example 4*

| | Cell G | Cell H |
|---|---|---|
| Depolarizer | Benzene | Benzene. |
| Catalyst | None | 5% Rhodium on carbon. |
| Anode | Platinum | Platinum. |
| Electrolyte | 10% acetic acid+20% sodium acetate, pH: 4.5. | 10% acetic acid+20% sodium acetate, pH: 4.5. |
| Constant Current Rate. | 15 milliamps | 15 milliamps. |

*Example 5*

| | Cell I | Cell J |
|---|---|---|
| Depolarizer | Metadinitrobenzene | Metadinitrobenzene. |
| Catalyst | None | 5% Palladium on carbon. |
| Anode | Platinum | Platinum. |
| Electrolyte | 27% H₂SO₄ | 27% H₂SO₄. |
| Constant Current Rate. | 15 milliamps | 15 milliamps. |

The results of the voltage measurements taken with Examples 3 through 5 will now be set forth in tabular form:

CATHODE POTENIAL

| Minutes, Cumulative | Example 3 | |
|---|---|---|
| | Cell E | Cell F (catalyst) |
| 30 | +0.093 | +0.409 |
| 60 | +0.076 | +0.381 |
| 90 | | |
| 120 | +0.073 | +0.352 |
| 150 | +0.059 | +0.330 |
| 180 | +0.037 | +0.239 |
| 210 | +0.004 | +0.161 |
| 270 | −0.179 | +0.077 |

| Minutes, Cumulative | Example 4 | |
|---|---|---|
| | Cell G | Cell H (catalyst) |
| 30 | −0.250 | −0.169 |
| 60 | −0.297 | −0.249 |
| 90 | −0.344 | |
| 120 | | −0.350 |
| 150 | −0.493 | −0.369 |
| 180 | −0.629 | −0.374 |
| 210 | −0.639 | −0.386 |
| 270 | −0.646 | −0.392 |

| Minutes, Cumulative | Example 5 | |
|---|---|---|
| | Cell I | Cell J (catalyst) |
| 30 | +0.281 | +0.412 |
| 60 | +0.256 | +0.404 |
| 90 | +0.246 | +0.398 |
| 120 | +0.244 | +0.393 |
| 150 | | |
| 180 | +0.244 | +0.388 |
| 210 | +0.244 | +0.386 |
| 270 | +0.246 | +0.382 |

Figure 6:
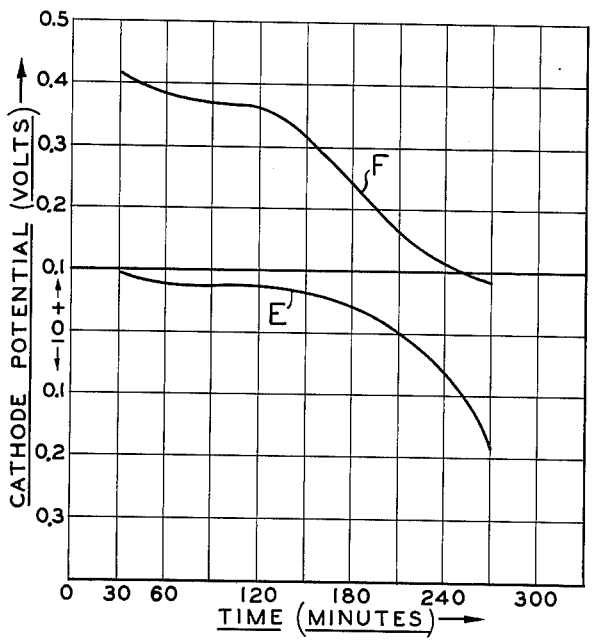
Figure 7:
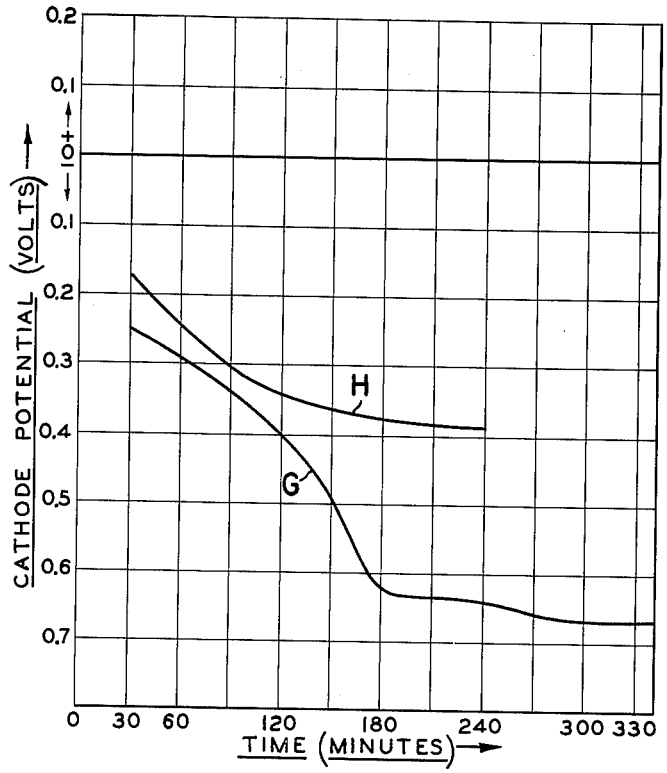
Figure 8:
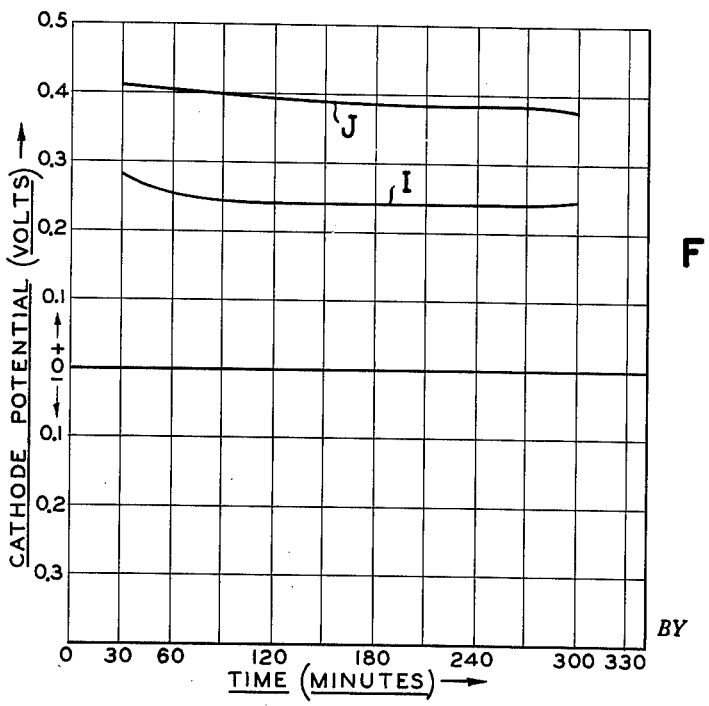

FIGS. 6, 7 and 8 indicate the higher potential which was obtained with cells F, H and J as compared with the cells E, G and I, respectively, which did not include platinum group metal catalysts.

*Example 6*

In another set of tests, naphthalene was reacted both with and without a rhodium catalyst. The electrolyte was an aqueous solution of MgBr₂6H₂O, and a magnesium anode was used in each case. During the first hour of operation, the cell with the rhodium catalyst provided an output which was between 0.1 and 0.2 volt better than the cell without the catalyst. Particularly where a high initial voltage is required, therefore, this increase may be obtained by the use of a platinum group catalyst and naphthalene as a cathodic reactant.

As discussed above, the catalysts which may be used include any of the six platinum group elements with preference being given to platinum, rhodium and palladium. Rhodium and palladium are particularly to be preferred. The catalysts may be added to the cathodic reaction zone either as unsupported metal or oxide, or dispersed in either reduced or unreduced form on a carrier, or may be in the cathode structure per se. As mentioned above, the catalyst may be supported on the carbon particles in the case of FIG. 1 or as a deposited layer or trace on the cathode electrode in the fuel cell arrangement of FIG. 3. Any carrier not interfering with electronic conductivity may be used, with materials having a large surface area, such as carbon, being preferred. When the term "platinum group metal catalyst" is employed, it is understood that the catalyst may be in any of these forms.

In the examples, the metallic catalyst was present in an amount of 0.0025 gram, supported on 0.050 gram of carbon. Thus, the metallic catalyst constituted five percent by weight of the supporting material. The supported catalyst may be made by any known technique, such as, for example, one of the methods disclosed in Jay G. Kaplan and Paul N. Rylander patent application Serial No. 18,516 filed March 30, 1960. The supported catalyst was then admixed with additional carbon. In general, the amount of catalyst can range from traces of metallic catalyst on a supporting material up to unsupported catalyst. For many purposes, a supported catalyst including about 0.5 percent to 20 percent of metallic catalyst is satisfactory.

In the test cells as described in FIG. 1, the cathodic reactant was present in an amount of 0.5 gram, while the amount of metallic catalyst was 0.0025 gram. This corresponds to a concentration of 0.5 percent of metallic catalyst with respect to the cathodic reactant. More generally, it is contemplated that concentrations of from 0.05 percent to 5 percent may be employed.

With regard to temperatures and pressures, a wide range may be employed. This range extends from atmospheric pressure and the lower ambient temperatures such as —40 C. found in arctic areas where electric cells may be employed, up to the elevated pressures and temperatures which may be used in fuel cells. In fuel cell applications, temperatures may extend to 300° C. or higher, and pressures up to several hundred pounds per square inch may be employed.

In the Examples 1 through 6, various cathodic reactants were employed; specifically, in Example 1 and 2 the compound, 2 butyne 1-4 diol, was employed; in Examples 3 and 4, benzene was the cathodic reactant; in Example 5 the cathodic reactant was metadinitrobenzene; and in Example 6 the cathodic reactant was naphthalene. In each case the reduction of the cathodic reactant was enhanced by the presence of the catalysts. The nature of the reduction reaction in each case is of some interest and will now be considered. With regard to both the naphthalene and the benzene, the reduction involves the saturation of an aromatic. Thus, in the case of naphthalene, the ultimate reaction product would be Decalin. Similarly, the benzene ring is reduced toward cyclohexane. The compound, 2 butylne 1-4 diol, is characterized by the triple bond between two carbon atoms. Reduction of this compound is accomplished by reducing at the triple bond. In the example of metadinitrobenzene, the nitro substituents are reduced toward the corresponding amino substituents. This involves the reduction of $NO_2$ to $NH_2$ in combination with the formation of water. From the foregoing examples, it is apparent that catalytic action is helpful in improving the current generating capacities of electric cells involving many different forms of cathodic reactant.

It is to be understood that the above described arrangements are illustrative of the application of the principles of the invention. Numerous other arrangements may be devised by those skilled in the art without departing from the spirit and scope of the invention.

What is claimed is:

1. In an electricity generating cell of the type having an anode selected from the group consisting of magnesium and zinc, a cathode and an electrolyte in contact with said anode and said cathode, and wherein electricity is generated by reduction of an organic cathodic reactant selected from the group consisting of aromatic hydrocarbon compounds, acetylenic compounds and nitro compounds in contact with said cathode, the improvement consisting of a cathode having supported thereon a platinum group metal catalyst.

2. The improvement of claim 1 wherein the cathode consists of carbon having supported thereon a platinum group catalyst.

3. The improvement of claim 2 wherein the platinum group metal catalyst is palladium.

4. The improvement of claim 2 wherein the platinum group metal catalyst is rhodium.

5. The electricity generating cell of claim 1 wherein the organic cathodic reactant is a reducible aromatic hydrocarbon compound.

6. The electricity generating cell of claim 5 wherein the aromatic compound is benzene.

7. The electricity generating cell of claim 5 wherein the aromatic compound is naphthalene.

8. The electricity generating cell of claim 1 wherein the organic cathodic reactact is an acetylenic compound.

9. The electricity generating cell of claim 8 wherein the acetylenic compound is 2-butyne-1,4-diol.

10. The electricity generating cell of claim 1 wherein the organic cathodic reactant is a nitro compound.

11. The electricity generating cell of claim 10 wherein the nitro compound is metadinitrobenzene.

References Cited by the Examiner

UNITED STATES PATENTS

| 2,384,463 | 9/1945 | Gunn et al. | 136—86 |
| 2,921,110 | 1/1960 | Crowley et al. | 136—86 |
| 2,925,454 | 2/1960 | Justi et al. | 136—86 |
| 2,976,342 | 3/1961 | Morehouse et al. | 136—86 |

FOREIGN PATENTS

| 12,171 | 7/1899 | Great Britain. |

WINSTON A. DOUGLAS, *Primary Examiner.*

JOSEPH REBOLD, JOHN R. SPECK, JOHN H. MACK,
*Examiners.*